United States Patent [19]

Suzuki

[11] Patent Number: 4,514,737

[45] Date of Patent: Apr. 30, 1985

[54] PRINTING HEAD DRIVING APPARATUS

[75] Inventor: Kuniaki Suzuki, Tokyo, Japan

[73] Assignee: Tokyo Shibaura Denki Kabushiki Kaisha, Kawasaki, Japan

[21] Appl. No.: 493,275

[22] Filed: May 10, 1983

[30] Foreign Application Priority Data

May 13, 1982 [JP] Japan .................................. 57-80519

[51] Int. Cl.[3] .............................................. G01D 15/10

[52] U.S. Cl. ................................ 346/76 PH; 400/120; 219/216

[58] Field of Search .................... 219/216; 346/76 PH; 400/120; 144/358; 101/8, 9, 21, 25, 27, 31; 250/316.1, 317.1, 318, 319

[56] References Cited

U.S. PATENT DOCUMENTS

| | | | |
|---|---|---|---|
| 3,885,469 | 5/1975 | Sugimoto et al. | 101/93.48 |
| 4,027,761 | 6/1977 | Quaif | 197/1 R |
| 4,168,421 | 9/1979 | Ito | 346/76 R |
| 4,370,666 | 1/1983 | Noda et al. | 346/76 PH |
| 4,409,600 | 10/1983 | Minowa | 346/76 PH |
| 4,434,354 | 2/1984 | Nakata | 346/76 PH |
| 4,442,342 | 4/1984 | Yoneda | 346/776 |

*Primary Examiner*—E. A. Goldberg
*Assistant Examiner*—A. Evans
*Attorney, Agent, or Firm*—Cushman, Darby and Cushman

[57] ABSTRACT

According to this invention, a voltage signal generating circuit is provided for generating a voltage signal in synchronism with a print timing signal produced when a printing head is driven. A detection circuit detects a power source voltage for driving the printing head. A driving pulse output circuit outputs a driving pulse signal having a pulse generating timing and pulse width corresponding to variations in the power source voltage, on the basis of the voltage signal which is output from the voltage signal generating circuit and detection signal which is output from the detection circuit. A driving circuit is adapted to drive a driving head with a printing timing and printing pressure corresponding to the driving pulse signal.

9 Claims, 21 Drawing Figures

FIG. 7
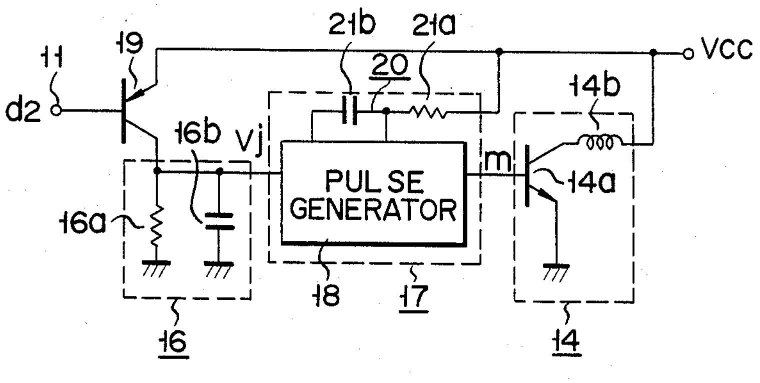
FIG. 8a
FIG. 8b
FIG. 8c
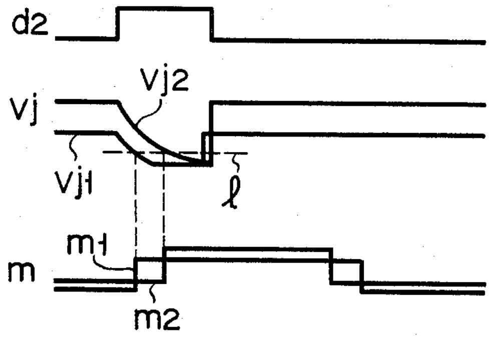

FIG. 9
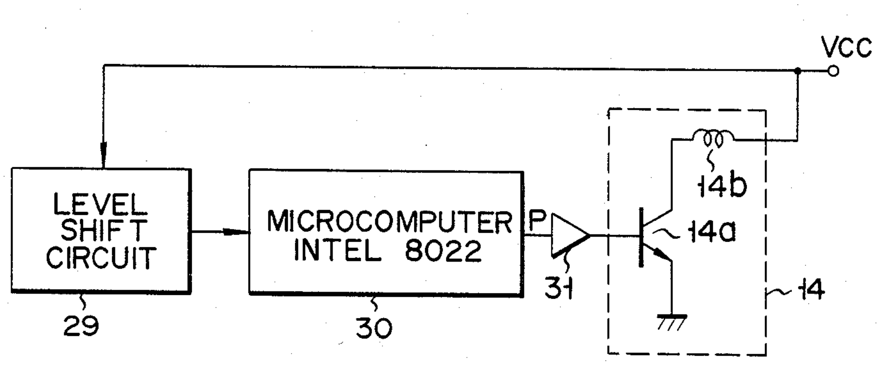
FIG. 10
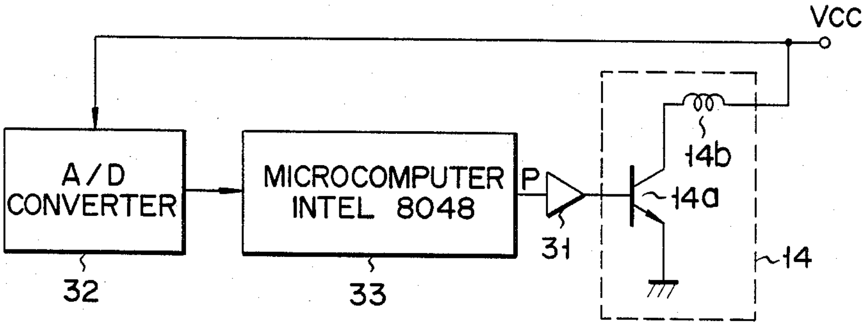
FIG. 11a
FIG. 11b
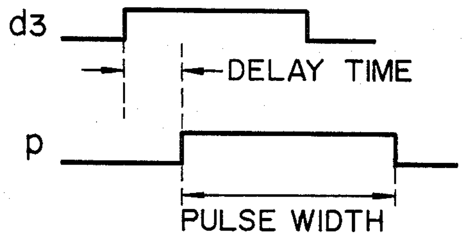

PRINTING HEAD DRIVING APPARATUS

BACKGROUND OF THE INVENTION

This invention relates to a printing head driving apparatus designed especially for use in an impact printer and a thermal printer.

In general, an impact printer is adapted to drive a printing head through a solenoid, effecting a printing operation. As shown in FIG. 1, an impact printer is of such a structure that an impact wire pin 1 is mounted on an armature. By the operation of the armature 2, the impact wire pin 1 is guided toward the forward end of the printing head. The armature 2 is attracted to a core 4, upon excitation of a solenoid coil 3. The printing head is driven in synchronism with the timing of the driving pulse signal (a pulse signal synchronized with a printing timing signal), as shown in FIG. *2a*. Thus, an excitation current b flows through the coil 3, shown in FIG. *2b*, based on the timing of the driving pulse signal a to excite the solenoid.

When a power source voltage supplied to the impact printer varies, there is the possibility that the printing head will sometimes be driven in an unstable fashion. This is due to the fact that the printing timing, printing pressure, etc., become unstable as a result of variations in the power source voltage and printing quality is thus degraded. Specifically, when comparison is made between the waveform b1 of a driving current (i.e., the excitation current of the solenoid) in the case of a high power source voltage, and a driving current waveform b2, in the case of a low power source voltage, it may be seen that a variation occurs in their rise time, as shown in FIG. *2b*. In the driving operation of the printing head, variations in the power source voltage cause the mistiming of the printing operation and/or the lowering of printing pressure energy, due to an attractive force of the solenoid.

In the thermal printer, a printing operation is carried out by a thermal head equipped with a heat generating element. The thermal head is so formed that heat generating elements 5 and a signal line 7 are wire-printed on a substrate 6, as shown in FIG. *3a*. The substrate 6 is usually made of an insulating material, such as an alumina ceramic materials and has high thermal conductivity. The heat generating elements 5 are arranged in one row or more on the substrate 6. The number of the heat generating elements 5 is so determined as to correspond to the kinds of dots, such as the number of dots constituting one character and the number of dots for covering the whole surface of a printing paper sheet.

The thermal head is normally made of a thermal element which is formed of a resistor and generates heat upon the expenditure of electrical power. A printing operation is carried out by bringing a paper sheet into direct, firm contact with the heat generating elements 5 shown in FIG. *3b*, or by placing a transfer film between the heat generating element 5 and the paper sheet. In this case, the heat generating element 5 generates heat in synchronism with a driving pulse signal, as shown in FIG. *4a*. The heat generation timing b of the heat generating element 5 varies, according to variations in the power source voltage of the thermal printer, as shown in FIG. *4b*. When comparison is made between a heat generation timing waveform b1, in the case of a high power source voltage, and a heat generation timing waveform b2, in the case of a low power source voltage, their timings are as different in the thermal printer as they are in the impact printer.

To prevent such an inconvenience, a voltage stabilizing circuit is provided in both the conventional impact printer and the thermal printer. Some impact printers have such an arrangement that, for example, a current feedback circuit is provided for each solenoid. In the conventional system, however, a printing head driving circuit, power source circuit, etc., of the impact printer and thermal printer become complicated in their arrangement, increasing the costs of the printer as a whole.

SUMMARY OF THE INVENTION

Accordingly, the object of this invention is to provide a printing head driving apparatus which can stabilize the printing timing and printing pressure of a printing head with a simple circuit arrangement, even if there is variation in the power source voltage of an impact printer, thermal printer, etc.

According to this invention, a pulse signal outputting means is provided for outputting a pulse signal in synchronism with a printing head driving pulse signal, i.e., in synchronism with a print timing pulse signal. According variations in a power source voltage, the pulse signal outputting means is adapted to output the pulse signal which varies to a predetermined pulse width. A driving circuit of the printing head is driven in synchronism with the pulse signal output from the pulse signal outputting means. According to this invention, the pulse signal output from the pulse signal outputting means varies in its pulse width according to variations in a power source voltage. Thus, as the power source voltage is increased, the width of the pulse signal becomes shorter; and, as the power source voltage is lowered, the width of the pulse signal becomes longer. Where a variation in the power source voltage occurs, a driving circuit of the printing head is driven in synchronism with the pulse signal, with the result that the printing timing and printing pressure of the printing head are made substantially constant, i.e., are stabilized. This permits the positive realization of a high-quality printing. The impact printer and thermal printer, for example, obviate the necessity of providing a circuit for stabilizing the power source voltage. As a result, the respective printers can be made simple in their arrangement, reducing the cost of the resultant system.

Figure 1:
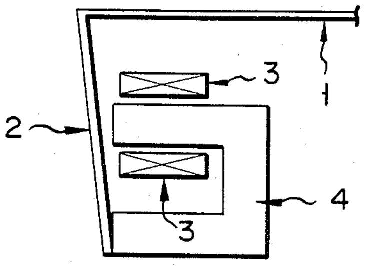
FIG. 1 (PRIOR ART)
FIG. 1 is a cross-sectional view showing an arrangement of the printing head of a conventional impact printer.
Figure 2A:
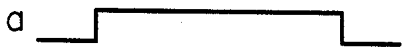
FIG. 2a (PRIOR ART)
Figure 2B:
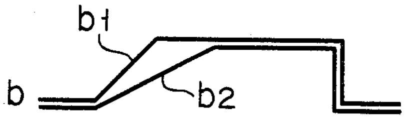
FIG. 2b (PRIOR ART)
Figure 3A:
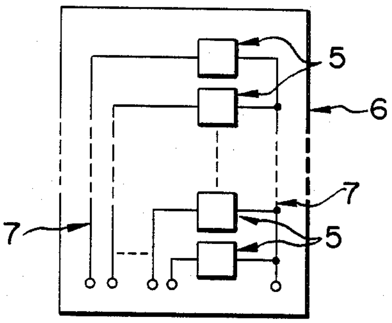
FIG. 3a (PRIOR ART)
Figure 3B:
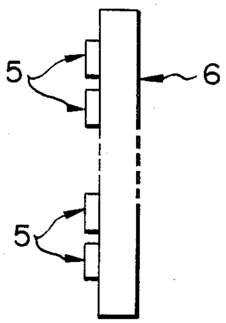
FIG. 3b (PRIOR ART)
Figure 4A:
FIG. 4a (PRIOR ART)
Figure 4B:
FIG. 4b (PRIOR ART)
Figure 5:
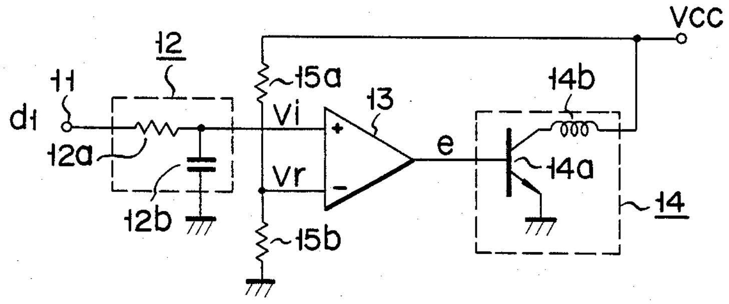
Figure 6A:
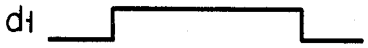
Figure 6B:
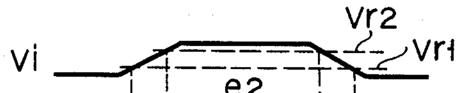
Figure 6C:
Figure 12:
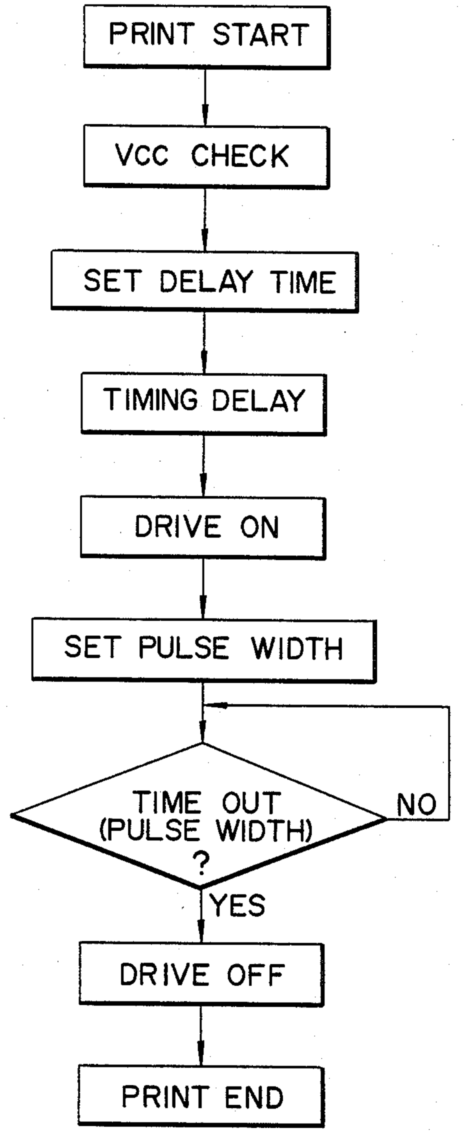
Figure 13:
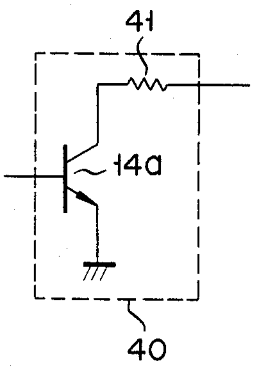

FIG. *2a* illustrates a timing chart showing the timing of driving pulse signal a of a conventional printing head and FIG. *2b* illustrates a timing chart showing excitation current waveform b of a solenoid of the conventional printing head;

FIG. *3a* is a plan view showing an arrangement of a thermal head of the conventional thermal printer and FIG. *3b* is a cross-sectional view showing an arrangement of a thermal head of the conventional thermal printer;

FIG. *4a* gives a timing chart showing the timing of a driving pulse signal a of the conventional thermal head and FIG. *4b* gives a timing chart showing the heat generation timing b of the conventional thermal head;

FIG. 5 is a circuit diagram showing a printing head driving apparatus according to a first embodiment of this invention;

FIG. 6a gives a timing chart showing the timing of the print timing signal d1 of a circuit shown in FIG. 5, FIG. 6b gives a timing chart showing the timing of voltage Vi of the circuit shown in FIG. 5 and FIG. 6c gives a timing chart showing the timing of driving pulse signal e of the circuit of FIG. 5;

FIG. 7 is a circuit diagram showing a printing head driving apparatus according to a second embodiment of this invention;

FIG. 8a illustrates a timing chart showing a print timing signal d2 of the circuit of FIG. 7, FIG. 8b illustrates a timing chart showing a voltage signal Vj of the circuit of FIG. 7 and FIG. 8c illustrates a timing chart showing a driving pulse signal m of the circuit of FIG. 7;

FIG. 9 is a circuit diagram showing a printing head driving system according to a third embodiment of this invention;

FIG. 10 is a circuit diagram showing a printing head driving system according to a fourth embodiment of this invention;

FIG. 11a illustrates a timing chart showing a print timing signal d3 of the circuit of FIGS. 9 and 10, while FIG. 11b illustrates a timing chart showing a driving pulse signal p of the circuit of FIGS. 9 and 10;

FIG. 12 shows a flow chart explaining the operation of the microcomputer of FIGS. 9 and 10; and FIG. 13 is a circuit diagram showing a driving circuit of a thermal printer.

DETAILED DESCRIPTION OF THE PREFERRED EMBODIMENTS

A printing head driving apparatus according to one embodiment of this invention will be explained below, with reference to FIGS. 5 and 6a to 6c.

In the first embodiment shown in FIG. 5, a print timing signal d1 is supplied through an input terminal 11 to an integrating circuit 12. The print timing signal d1 is a timing pulse signal for determining the start of a printing operation of an impact printer. The integrating circuit 12 comprises a resistor 12a and capacitor 12b. The resistor 12a is connected at one end to the input terminal 11. Upon receipt of a timing signal d1, as shown in FIG. 6a, the integrating circuit 12 generates a predetermined voltage signal Vi, as shown in FIG. 6b, which has a rise start time and fall start time corresponding to a CR time constant of the resistor 12a and capacitor 12b. The voltage signal Vi output from the integrating circuit 12 is supplied to one input terminal, e.g., to a noninverting input terminal of a voltage comparator 13.

The voltage comparator 13 comprises, e.g., an ordinary operational amplifier. The noninverting input terminal of the comparator is connected to a common junction of the resistor 12a and capacitor 12b in the integrating circuit 12. The voltage comparator 13 has the other input terminal, i.e., an inverting terminal, connected to a series circuit of resistors 15a, 15b, which in turn is connected to a power source terminal Vcc. A reference voltage Vr corresponding to the voltage at a junction of the resistors 15a,15b is supplied to the inverting terminal of the comparator 13. The comparator 13 compares voltages Vi and Vr to deliver an output signal (a driving pulse signal) e to the driving circuit 14 of a printing head. The driving circuit 14 normally includes an emitter-grounded transistor 14a and a coil 14b of a solenoid. The driving circuit 14 has such an arrangement that the transistor 14a is driven by a drive pulse signal e output from the voltage comparator 13 to cause an excitation current to flow through the coil 14b, i.e., to cause an excitation current to be supplied from the power source terminal Vcc.

In the circuit arrangement mentioned, when the print timing signal d1 shown in FIG. 6a is supplied to the integrating circuit 12, a voltage signal Vi having the rise start time and fall start time shown in FIG. 6b is supplied to the noninverting terminal of the voltage comparator 13. The above-mentioned reference voltage Vr is supplied to the inverting input terminal. The voltage comparator 13 compares voltage Vi and reference voltage Vr to produce a pulse signal which rises when, for example, voltage Vi is higher in level than reference voltage Vr. In this case, a variation in the level of the power source voltage Vcc causes a variation in the level of the reference voltage Vr. For this reason, the output pulse signal e of the voltage comparator 13 varies in its rise start time and pulse width. Thus, with Vr1 representing a reference voltage when the power source voltage Vcc falls to a level lower than normal, the voltage signal Vi is sliced with the reference voltage Vr1, as shown in FIG. 6c, to cause the voltage comparator 13 to produce a driving pulse signal e1. With Vr2 representing a reference voltage when the power source voltage Vcc rises above the normal level, the voltage signal Vi is sliced with the reference voltage Vr2 to cause the voltage comparator to produce a driving pulse signal e2. Thus, when the power source voltagc Vcc is at a level which is lower than normal, the output pulse signal e of the voltage comparator 13 becomes a pulse signal e1 with a quick rise start time and a greater pulse width; whereas, when the power source voltage Vcc is at a level which is higher than normal, the output pulse signal e of the voltage comparator 13 becomes a pulse signal e2 with a slow rise time and a smaller pulse width.

In this way, the voltage comparator 13 delivers the driving pulse signal e, with a rise start time and a pulse width corresponding to a variation of the power source voltage Vcc, to the driving circuit 14 of the printing head. The driving circuit 14 permits an excitation current, the timing of which corresponds to that of the drive pulse signal e, to flow through the coil 14b of the solenoid, causing the printing head to be driven. Therefore, when the power source voltage Vcc falls to a level which is lower than normal, the driving pulse signal e1 with a quick rise start time and a greater pulse width is supplied to the driving circuit 14. Within the driving circuit 14, the rise time of the excitation current waveform of the coil 14b in the solenoid can be quickened by the driving pulse signal e1. For this reason, a situation wherein the printing timing may be delayed when the power source voltage Vcc falls to a level lower than normal can be positively prevented. Since the driving pulse signal e1 has a greater pulse width, the excitation current flows through the coil 14b for a relatively long period of time, thus allowing the attractive force of the solenoid to be increased. It is therefore possible to prevent the printing pressure of the printing head from being lowered as a result of a drop in the power source voltage. With the power source voltage Vcc being at a level which is higher than normal, the driving pulse signal e2 with a slow rise start time and a smaller pulse width is supplied to the driving circuit 14. By the drive pulse signal e2, the rise time of the excitation current waveform in the coil 14$b$ of the solenoid is slowed down within the driving circuit 14, thereby positively preventing a situation wherein the printing time may be quickened when the power source voltage Vcc rises above the normal level. Since the driving pulse signal e2 has a smaller pulse width, the excitation current flows through the coil 14$b$ of the solenoid for a relatively short period of time, thereby relatively weakening the attractive force of the solenoid. It is therefore possible to prevent the printing pressure of the printing head from being increased to an unnecessary extent.

The second embodiment of this invention will be explained below with reference to FIGS. 7 and 8$a$ to 8$c$.

In a circuit of the second embodiment shown in FIG. 7, a print timing signal d2 is supplied through an input terminal 11 to the base of a transistor 19 of a PNP type. The transistor 19 has its emitter supplied with a power source voltage Vcc and its collector connected to a differentiation circuit 16. With the transistor 19 ON, a power source voltage Vcc is supplied to the differentiation circuit 16. The differentiation circuit 16 comprised of a resistor 16$a$ and capacitor 16$b$ delivers a voltage signal Vj, corresponding to a CR time constant of the resistor 16$a$ and capacitor 16$b$, to a monostable multivibrator 17. The monostable multivibrator 17 includes, for example, a pulse generator 18 and delay circuit 20 comprised of a resistor 21$a$ and capacitor 21$b$, and is triggered according to the voltage signal Vj to deliver an output pulse signal (i.e., a driving pulse signal) m of a pulse width corresponding to a delay time of the delay circuit 20. The delay time of the delay circuit 20 is set according to the level of the power source voltage Vcc and time constant CR of the resistor 21$a$ and capacitor 21$b$. The driving pulse signal m of the monostable multivibrator 17 is supplied to a driving circuit 14 which has the same arrangement as that shown in FIG. 5.

When the timing signal d2 shown in FIG. 8$a$ is supplied to the base of the transistor 19, the differentiation circuit 16 delivers a voltage signal Vj, as shown in FIG. 8$b$. With the transistor 19 ON, the capacitor 16$b$ in the differentiation circuit 16 is charged. A voltage signal Vj which is increased up to a predetermined level is supplied to the monostable multivibrator 17. With the transistor OFF, the capacitor 16$b$ is discharged in such a way that the voltage signal Vj begins to fall according to the CR time constant of the differentiation circuit 16. When the power source voltage Vcc varies and reaches a high level, the voltage signal Vj of the differentiation circuit 16 becomes voltage Vj2, as shown in FIG. 8$b$; while, with the power source voltage Vcc at a low level, the voltage signal Vj of the differentiation circuit 16 becomes voltage Vj1. The monostable multivibrator 17 is triggered into operation at a predetermined level (i.e., at the level shown in FIG. 8$b$) of the voltage signal Vj delivered from the differentiation circuit 16. The triggering timing of the monostable multivibrator varies according to voltage signals Vj1 and Vj2 of the differentiation circuit 16. When the power source voltage Vcc varies and falls to a low level, the rise start time of an output pulse signal m1 of the monostable multivibrator 17 starts earlier than that of an output pulse signal m2 produced when the power source voltage Vcc is at a high level. Since the power source voltage Vcc is supplied to the delay circuit 20 in the monostable multivibrator 20, the delay time varies, due to a variation in the power source voltage Vcc, causing a variation in the pulse width of output pulse signal m of the monostable multivibrator 17. In other words, the pulse width of the output pulse signal m1 when the power source voltage Vcc is at a lower than normal level rises to a level greater than that of an output pulse signal m2 produced when the power source voltage is at a higher than normal level. In this way, the monostable multivibrator 17 delivers an output pulse m, with a rise start time and pulse width corresponding to a variation of the power source voltage Vcc, to the driving circuit 14 of the printing head. In the driving circuit 14, an excitation current corresponding to the timing of the pulse signal m flows through a coil 14$b$ in the solenoid, causing the printing head to be driven. With the power source voltage at a low level, a pulse signal m1 with a quick pulse time is supplied to the driving circuit 14, so that the excitation current flowing through the coil of the solenoid has a quick rise time. As a result, it is possible to positively prevent the mistiming of printing resulting from a lowering of the power source voltage Vcc. Moreover, since the width of the pulse signal m1 is increased, the excitation current flows through the coil 14$b$ of the solenoid over a longer period of time and it is also possible to positively prevent a lowering of the printing pressure of the printing head which might result from the attractive force of the solenoid. With the power source voltage Vcc at a high level, a driving pulse signal m2 with a slow rise start time and a smaller pulse width is supplied to the driving circuit 14. Due to the driving pulse signal m2, the rise time of the excitation current through the coil 14$b$ becomes slower in the driving circuit 14, positively preventing a situation wherein the printing timing is quickened, with the power source voltage Vcc being at a high level. Since the pulse width of the driving pulse signal m2 is decreased, the excitation current flows through the coil 14$b$ during a relatively briefer period, causing the attractive force of the solenoid to be relatively weakened. It is thus possible to prevent the printing pressure of the printing head from increasing unnecessarily.

The third and fourth embodiments of this invention will be explained below, with reference to FIGS. 9, 10, 11$a$, 11$b$ and 12.

In the third embodiment, as shown in FIG. 9, a variation in the power source voltage Vcc is detected through a microcomputer (e.g., the microprocessor 8022 manufactured by INTEL Corporation) 30. The power source voltage Vcc is supplied to a microcomputer 30 through a level shift circuit 29, The output signal (a pulse signal) of the microcomputer 30 is supplied to a driving circuit 14 after being amplified by an operational amplifier 31. The microcomputer 30 performs operations such as that shown in the flow chart of FIG. 12, according to a program initially stored. When a print operation starts, the print timing signal d3 shown in FIG. 11$a$ is produced within the microcomputer 30. Then, a variation of the power source voltage Vcc is detected. The delay time and pulse width of a driving pulse signal p, as shown in FIG. 11$b$ with respect to the print timing signal d3, is determined according to a variation of the power source voltage Vcc. The microcomputer 30 produces a drive pulse signal p, as shown in FIG. 11$b$, whose rise time is delayed with reference to the timing signal d3 for the interval mentioned. The driving pulse signal p continues to be supplied until the period of time corresponding to the pulse width so determined has elapsed. Then, the generation of the driving pulse signal p is stopped.

The driving pulse signal p is supplied from the computer 30 to the driving circuit 14 after being amplified through the operation amplifier 31. In the driving circuit 14, an excitation current corresponding to the timing of the driving pulse signal p flows through the coil 14*b* of the solenoid. As a result, the printing head is driven to permit printing to be performed, for example, for each dot timing. The microcomputer 30 delivers the driving pulse signal as a pulse signal having a rise start time and pulse width corresponding to variations in the power source voltage Vcc. Thus, when a variation in the power source voltage Vcc occurs, it is possible to adjust the rise time and period of the excitation current flowing through the coil 14*b* of the solenoid, whereby the printing timing and printing pressure can be stabilized.

In the fourth embodiment shown in FIG. 10, the power source voltage Vcc is, after being converted to a digital signal by an A/D converter 32, supplied to a microcomputer (e.g., microprocessor 8048, which is manufactured by INTEL Corporation) 33. In this case, the microcomputer 33 has a digital input/output port in which input and output signals are digital signals only. As in the case of the third embodiment, this embodiment has a marked advantage which is shown in FIG. 9.

Although, in the first to fourth embodiments, this invention has been explained as being applicable to the impact printer, it is not restricted thereto. This invention may also be applied to the thermal printer. In the driving circuit 40 of the printer, a heat generating resistor 41 is provided, as shown in FIG. 13, in place of the coil 14*b* in the solenoid of the impact printer.

What is claimed is:

1. A printing head driving apparatus comprising:

input voltage signal generating means for generating an input voltage signal having a predetermined rise time or a predetermined fall time in synchronism with a print timing signal generated when a printing head is driven;

reference voltage signal generating means for generating a reference voltage signal of a varying level corresponding to a variation of a power source voltage for driving the printing head;

driving pulse signal outputting means for comparing the level of said input voltage signal and the level of said reference voltage signal to produce a driving pulse signal having a pulse generation timing and pulse width corresponding to the variation of the power source voltage; and driving means for driving the printing head on the basis of the driving pulse signal which is output from the driving pulse signal outputting means.

2. A printing head driving apparatus according to claim 1, in which said input voltage signal generating means comprises an integrating circuit including a resistor and a capacitor, a print timing signal being input to one terminal of said resistor and said input voltage signal is provided at a junction of the resistor and capacitor.

3. A printing head driving apparatus according to claim 1, in which said reference voltage generating means comprises a resistive voltage divider.

4. A printing head driving apparatus comprising:

input voltage signal generating means for generating an input voltage signal having a predetermined rise time or a predetermined fall time, according to a print timing signal generated when a printing head is driven, and the variation of a power source voltage for driving the printing head;

driving pulse signal outputting means for outputting a drive pulse signal having a pulse generating timing synchronized with the input voltage signal and a pulse width corresponding to the variation of the power source voltage; and driving means for driving the printing head in response to the driving pulse signal which is output from the drive pulse signal outputting means.

5. A printing head driving apparatus according to claim 4, in which said input voltage signal generating means comprises a transistor and a differentiation circuit, a print timing signal being input to the base of said transistor and the power source voltage being supplied to said differentiation circuit by driving the transistor.

6. A printing head driving apparatus according to claim 4, wherein said driving pulse signal outputting means comprises a monostable multivibrator which is triggered according to the input voltage signal to produce a pulse signal having a pulse width corresponding to the variation of the power source voltage.

7. A printing head driving apparatus comprising:

driving pulse outputting means including first means for generating a print timing signal when a printing head is driven; second means for detecting variation in a power source voltage for driving the print head; third means coupled to said second means, for generating a drive pulse signal according to variation in the power source voltage, with the timing there of being a function of the print timing signal, and the pulse width thereof being controlled according to variations in the power source voltage: and the rise of the print timing signal voltage, driving means for driving the printing head according to the driving pulse signal which is output from the driving pulse outputting means.

8. A printing head driving apparatus according to claim 7, in which said driving pulse outputting means comprises a microcomputer having an analog input port.

9. A printing head driving apparatus according to claim 7, wherein said driving pulse outputting means comprises an analog/digital converter and microcomputer.

* * * * *